Dec. 18, 1956   A. W. JACOBS   2,774,212
CHAIN TOOL WITH SINGLE DRIVE MEANS FOR PUNCH AND CLAMP
Filed Feb. 12, 1953
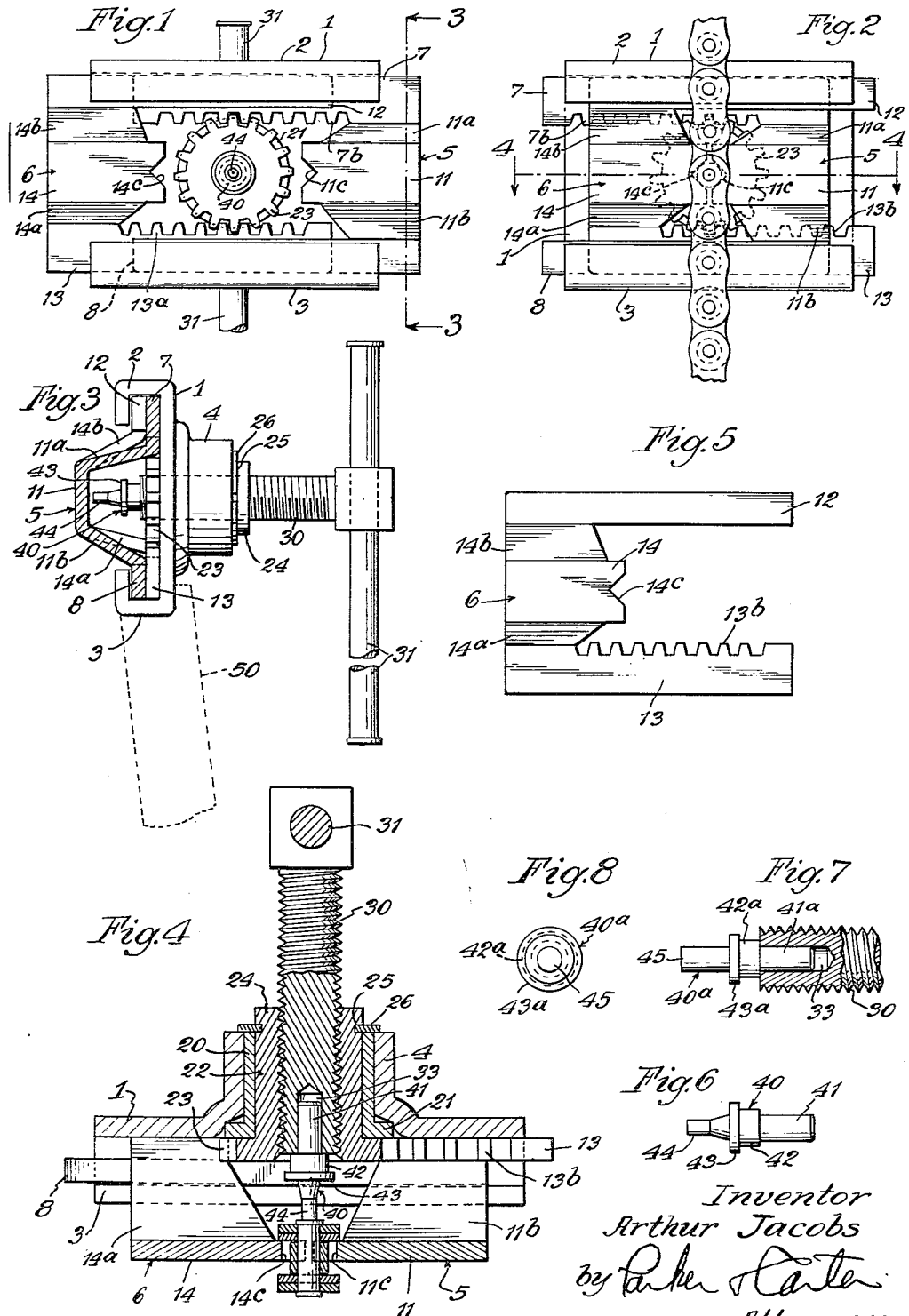
Inventor
Arthur Jacobs
by Parker & Carter
Attorneys

United States Patent Office 2,774,212
Patented Dec. 18, 1956

2,774,212

CHAIN TOOL WITH SINGLE DRIVE MEANS FOR PUNCH AND CLAMP

Arthur W. Jacobs, Chicago, Ill.

Application February 12, 1953, Serial No. 336,593

6 Claims. (Cl. 59—7)

My invention relates to tools for roller chains, and more particularly to an improved tool for accomplishing a number of operations on such chains.

A main object of my invention is to provide a novel and improved chain severing tool which is very simple in operation, which is easy and economical to manufacture and which is effective to remove the connecting rivet employed between adjacent sets of links of a roller or sprocket chain.

A further object is to provide a tool which shall be effective to insure the alignment of a pin or punch with the rivet employed between adjacent sets of links of a roller chain automatically and without a necessity for manual manipulation by or concentration on the part of the user.

A further object is to provide a chain tool which shall be usable with chains of varying sizes and having chain rollers of various sizes, the connecting rivets of which are spaced at varying distances from each other.

A further object is to provide a chain tool which shall be effective to grip and hold a chain and to accomplish the rapid removal of the connecting rivet employed between adjacent sets of links thereof all by the operation of one element of the tool.

A further object is to provide a tool which shall be effective to remove connecting rivets between adjacent sets of links of a sprocket or roller chain and also to accomplish the replacement of the roller links therein.

A further object is to provide a chain tool having a replaceable pin member or punch member adapted to various sizes of connecting rivets employed between adjacent sets of chain links.

A further object is to provide a chain tool which is effective to accomplish the removal of a replaceable pin or punch member supplied with the tool.

A further object is to provide a chain tool having roller gripping jaws which shall be effective automatically to center connecting rivets of roller chains of various sizes and to approach and grip such chain rollers of varying sizes in the same plane.

A further object is to provide a replaceable pin or punch member for chain tools which is adapted for easy removal from said tools.

In the use of roller chains, which are commonly supplied and used in many varying sizes, it is frequently necessary to remove a link from the chain. This is true when the chain is or becomes loose and requires shortening and also in those cases where removal of the chain from a machine would be facilitated by the removal of such link. The links of roller or sprocket chains are universally secured by rivets running therethrough. It is thus necessary to force the rivet outwardly from the link, to convert its flattened end back to a tubular form having an inner diameter less than that of the link. Various tools have been provided to accomplish this objective in the past. Such tools, however, have not proved entirely satisfactory. A different tool has been provided for each size chain. Since users normally employ chains of many varied sizes it is necessary, in the use of such prior tools, to purchase and store an equal number of tools. Consequently it is common practice to ignore such tools and to remove chain links by the expedient of cutting the link, which of course is not satisfactory. Furthermore users have found prior tools to be unwieldy, requiring the manipulation in sequence of various tool elements. Similarly it has been necessary with prior tools for the user to be very careful that the punch or pin member normally employed is in exact alignment with the rivet. When this is not done the tool is ineffective and the chain is normally damaged. Again, even with those tools which have attempted to at least partially solve the problem of employment with chains of various sizes the jaw members thereof when approaching some of such chain rollers do so at acute angles, thereby losing gripping force and failing to properly grip and center the roller and rivet. The pin members or punches of prior tools have a tendency to break and since those of prior tools have not been replaceable always, the entire tool was rendered ineffective thereby. Here again, since the pressures employed would tend to force a replaceable pin or punch member into its receptacle, it may be that for this reason such replaceable members have not usually been provided because of the difficulty of removal from such receptacles in the tool.

The problems outlined above as well as others become even more acute when the chain is in use in areas lacking a readily available machine shop and the economic resources required to stock chain tools of numerous sizes. A vast number of the chains in use are found for example on the farm where they are employed in a wide variety of implements and machines.

I illustrate my invention more or less diagrammatically in the accompanying drawings, wherein:

Figure 1 is a front elevation of my invention illustrating the parts in one position;

Figure 2 is a view similar to Figure 1 with parts in different position;

Figure 3 is a section taken on line 3—3 of Figure 1;

Figure 4 is a section on an enlarged scale taken on line 4—4 of Figure 2;

Figure 5 is a detailed view of one of the jaw members;

Figure 6 is a side view of the replaceable punch;

Figure 7 is a side view of an alternate replaceable punch; and

Figure 8 is an end view of the replaceable punch illustrated in Figure 7.

Like parts are indicated by like characters throughout the specification and drawings.

Referring now to the drawings, 1 generally indicates a base member, which may be flat and generally rectangular in plan. The base member 1 has the depending and inwardly turned opposite longitudinal edges forming longitudinal guides 2 and 3. Rising generally centrally from the top of the base member 1 is the generally circular sleeve 4 which may be integral with the base member 1 or secured thereto in any well known manner.

Slidably mounted within the longitudinal guides 2—3 are the jaw members 5 and 6. The jaw members 5 and 6 are identical and are therefore interchangeable. The jaw member 5 has a longitudinal arm 7, the length of which may be substantially equal to that of the base member 1. The arm 7 carries the inwardly disposed rack 7b. The jaw member 5 has a second longitudinal arm along its opposite edge indicated at 8 which may be generally equal in length to the arm 7. Positioned between the arms 7 and 8 at one end thereof is the work-engaging jaw 11 which is supported below the arms 7 and 8 by the downwardly inwardly inclined jaw portions 11a—11b. The jaw 11 has the groove 11c on its inner face. As will be best seen in Figure 3 the roller engaging jaw 11, portions 11a—11b and arms 7—8 may be integral. The portion 11a is longer than the portion 11b and the arm 7 is spaced from the jaw 11 further than the arm 8 for a distance generally equal to the thickness of the arms 7—8. The jaw 11 and arms 7 and 8 lie in generally parallel planes. The depending portions 11a—11b may be swept back from the inner face of the jaw member 11 toward the rear lateral edge of the jaw 5 as will be best seen in Figure 4 to permit the maximum room for chain portions to rest within the tool and between the jaw members 5—6.

The jaw member 6 is formed identically with the jaw 5 as described above. Thus the arm 13 carries the rack 13b and the jaw 14 depends from the arms 13—12. The downwardly inwardly inclined depending jaw portions are numbered 14a—14b and the groove in the inner face of the jaw 14 is numbered 14c.

Fitted within the cylindrical sleeve 4 is the bushing 20 which may have the outward angular flange 21 at its end beneath the sleeve 4. Rotatably mounted within the bushing 20 is the gear member 22 comprising a gear or toothed wheel 23 and an internally threaded sleeve 24. While the gear 23 and sleeve 24 are shown as being integral they may of course be formed separately and joined in any well known manner. The sleeve 24 has the inner annular groove 25 adjacent its end most remote from the gear 23. As will be best seen in Figure 4 the gear member is inserted from below the sleeve 4, the groove 25 coming to rest just above the upper outer edge of sleeve 4, the gear 23 being brought upwardly into contact with the outer face of the annular flange 21 on the bushing 20 and in horizontal alignment with the lower face of the base member 1 between the longitudinal guides 2—3. 26 is a slip ring adapted to fit within the groove 25 and to extend outwardly over the upper outer edge of the sleeve 4 to retain the bushing 20 and the gear member 22 within the sleeve 4.

As will be best seen in Figures 1, 3 and 4 the jaw members 5—6 are mounted within the longitudinal guides 2—3, the arms 7—13 with their inner racks 7b—13b are installed immediately below base member 1. The arms 8—12 underlie the arms 7—13 within the longitudinal guides 2—3. The gear member 23 is thus in mesh with the racks 7b—13b constantly. Rotatably threaded within the gear member 22 is the pressure screw or crank-rod 30. It will be understood that the threads of the rod 30 and the gear member 22 are such as to create friction therebetween. This friction in turn causes the gear to rotate with the rod but may be overcome when the gear is held against rotation, either manually or due to the presence of a roller between the jaws, in which event the rod may be further rotated through the gear member 22 which is thus held stationary. An operating handle 31 is provided on the outer end portion of the pressure screw 30 and may be slidably mounted therein to provide varied amounts of leverage. The ends of the handle 31 may be flattened or enlarged to prevent its release from the end of the pressure screw 30. The opposite end of the pressure screw 30 has the central bore or recess 33.

Illustrated in Figures 4 and 6 is my replaceable punch or pin member 40. 41 indicates a base adaptable to be pressure fitted in the bore 33 of the pressure screw 30. 42 indicates a shoulder of slightly greater diameter than the base 41 and adapted to seat upon the outer end face of the pressure screw 30. 43 is a second shoulder of greater diameter than the shoulder 42, 44 indicates the rivet contacting pin itself. When the punch 44 is substantially smaller in diameter than base 41 it may have a conical portion extending to the shoulder 43 for purposes of strength.

In Figures 7 and 8 I illustrate an alternate pin or punch member 40a which has a work contacting pin 45 of size different from the pin 44. It will be realized that various sizes may be provided. The base 41a and shoulders 42a and 43a of the pin 40a are identical with the base 41 and shoulders 42—43 of the pin 40, whereby the pins 40 and 40a may be interchangeably used with the pressure screw 30.

A suitable handle is shown in dotted lines at 50 in Figure 3. The handle 50, in operation of the tool, is grasped with one hand and the rod or operating handle 31 is turned with the other hand.

It will be realized that whereas I have described and illustrated an operative device, still many changes in the size, shape, number and arrangement of parts might be made without departing materially from the spirit of my invention. I wish, therefore, that the showing be taken as in a large sense diagrammatic rather than limiting me to the precise showing. For example, a rod having oppositely threaded ends may be mounted below one side of the base member 1. A V-grooved gear may be centrally fixed to said rod and in mesh with the gear 23 and the jaw members may have internally threaded side plates threaded on the ends of the rod. Thus rotation of the gear 23 would cause rotation of the rod to draw the jaws toward or away from each other.

The use and operation of my invention are as follows:

I provide a chain tool which is simple and easy to operate, requiring nothing more than manual turning of the operating handle 31 to remove the rivet from a roller chain. The chain is placed between the jaws, the chain lying generally perpendicular to the longitudinal guides 2—3. The handle 31 is then rotated to turn the screw 30. Rotation of the pressure screw 30 first causes rotation of the gear 23 which being in mesh with the racks 7b—13b cause these racks to move in opposite directions and to bring the jaw members 11—14 toward each other. Since the jaws lie in the same plane they approach and contact a roller evenly no matter what size the roller. The roller surrounding the rivet to be removed is thus gripped between the jaws and is centrally aligned by the grooves 11c—14c. Continued rotation of the pressure screw 30 serves not only to tighten the grip of the jaws 11—14 on the roller but also to advance the punch or pin 44 toward the rivet. Since the jaws through the racks attached thereto are automatically brought together evenly the roller and rivet is automatically centered with relation to the punch 44. As the pressure screw 30 continues its rotation it advances the punch member 44 to force the roller plate against the inner faces of the jaws 11—14 and to force the rivet through the roller. It is then necessary only to retract the pressure screw by rotating it in the opposite direction to cause the gear 23 to rotate and force the racks to travel again in opposite directions to separate the jaws and release the roller chain.

It will be realized that the link of a roller chain may be forced back over a rivet and by merely placing the roller beneath the grooved faces of the jaws 11—14 and advancing the pressure screw 30 to squeeze the link and rivet together between the pressure screw 30 and the underside of the end faces of the jaw 11—14.

In addition to providing a chain tool adapted for use with various sized roller chains I provide a replaceable pin or punch member which is suplied in varying sizes to correspond to the varying sizes of rivets employed with such roller chains. With the pressure normally employed in the removal of rivets the punch or pin member, if it is not integral with the pressure applying member such as my pressure screw 30, is forced ever more tightly into such pressure screw member. I provide a means whereby the tool itself may be readily and quickly used, by manual manipulation alone, to remove such pin members and to facilitate the replacement thereof. The shoulder 42 is effective to create a space between the inner face of the larger shoulder 43 and the end face of the pressure screw 30. This space is equal to the width of the end faces of the jaws 11—14. The operator therefore in removing the pin merely rotates the pressure screw to advance the pin beyond the jaw members 11—14 to the point at which the jaws 11—14 are in alignment with the space between the end face of the pressure screw 30 and the shoulder 43. The jaws are then permitted to enter this space through the rotation of the gear 23. It will be realized that the jaws 11—14 were held against closure during the initial rotation of the pressure screw 30 to permit the pin to advance beyond the jaws. With the pin thus gripped the screw 30 is reversed to withdraw it, the pressure of the jaw against the pin serving to hold the gear 23 from rotation. As the screw 30 is backed out it separates from the pin 40.

I claim:

1. A chain tool comprising a base member, guides on said base member, a pair of generally U-shaped chain gripping jaw members slidably mounted within said guides, a rotatable means on said base member between said guides, cooperating means on said rotatable member and said jaw members for causing said jaws to be moved towards and away from each other upon the rotation of said rotatable means, a rod in threaded engagement with said rotatable member, said rod being adapted for rotation through said rotatable member, said threaded engagement being effective to cause rotation of said rotatable means in response to rotation of said rod therethrough, a pin carried by said rod between said jaw-members and adapted, upon continued rotation of said rod, to contact the work between said jaw members the power necessary to rotate said rod relative to said rotatable means being greater than the power necessary to rotate said rotatable means relative to said jaw-members whereby initial rotation of said rod is effective to cause rotation of said rotatable means.

2. A chain tool comprising a base, jaw members movably mounted on said base, jaw-control means rotatably mounted on said base, cooperating means on said jaw members and on said jaw-control means adapted to cause said jaw members to move toward each other in response to rotation of said jaw-control means upon application of predetermined power, a pressure screw rotatably mounted in said jaw-control means in friction threaded relation with said jaw-control means and adapted, upon rotation in response to application of a power greater than said first-named power, to cause rotation of said jaw-control means, and a work-contacting portion on said screw adapted upon further rotation of said screw to contact the work held between said jaw members.

3. The structure of claim 2 characterized by and including a work-contacting member removably carried by said pressure screw.

4. In a chain tool, a base having longitudinal guides disposed along and below opposite edges thereof, a toothed-wheel rotatably mounted on said base in the general plane of and between said guides, a pair of jaws each having a pair of arms in different planes one from the other, said arms being slidably mounted in said guides, the upper arm of one jaw resting upon the lower arm of the other jaw within each guide, a rack on one arm of one jaw in one guide and a rack on the opposing arm of the other jaw in the opposite guide, both racks being in mesh with said wheel and adapted to be slidably moved within said guides in response to rotation of said wheel, a pressure screw frictionally threaded within said toothed wheel in alignment with the axis thereof and adapted, upon rotation, to cause rotation of said wheel when said wheel is free to rotate, said screw being adapted to be rotated further through said wheel after said wheel is no longer free to rotate, said screw having a manually operable portion extending above said base, and a pin removably carried in the end of said screw below said base and adapted in response to rotation of said screw beyond the point at which said wheel is no longer free to rotate to abut the end of a rivet in a chain held between said jaws, said pin having an enlargement spaced from the end of said screw for a distance sufficient to permit the entrance of a portion of each said jaw therebetween.

5. In a chain tool, a base, a pair of opposed jaw members slidably mounted on said base, each of said jaw members having an inwardly directed rack thereon, a toothed wheel rotatably mounted on said base, the teeth of said wheel being in engagement with each of said racks whereby rotation of said wheel is effective to cause movement of said jaws toward and away from each other, an externally threaded rod rotatably mounted in said wheel, said wheel having internal threads in engagement with the external threads on said rod, said rod being rotatable through said wheel in a plane generally perpendicular to the plane in which said jaws are slidable, the friction between the threads of said rod and said wheel being greater than that between said wheel and said base whereby rotation of said rod is effective to rotate said wheel to move said jaws to their maximum point of travel and thereafter continued rotation of said rod is effective to move said rod through said wheel.

6. The structure of claim 5 characterized by and including a pin removably carried by the inner end of said rod between said jaw members, said pin having a flange spaced from said rod a distance sufficient to permit the entry of said jaws between said flange and said rod.

References Cited in the file of this patent

UNITED STATES PATENTS

| | | |
|---|---|---|
| 548,359 | Fry | Oct. 22, 1895 |
| 807,064 | Day | Dec. 12, 1905 |
| 889,409 | Spalding | June 2, 1905 |
| 909,469 | Solberg | June 22, 1909 |
| 925,603 | Sinning | June 22, 1909 |
| 1,436,429 | Bean | Nov. 21, 1922 |
| 1,578,174 | Robinson et al. | Mar. 23, 1926 |
| 2,386,920 | Whistler | Oct. 16, 1945 |
| 2,534,094 | Yerkes | Dec. 12, 1950 |
| 2,616,712 | Mueller | Nov. 4, 1952 |
| 2,671,310 | Noach | Mar. 9, 1954 |

FOREIGN PATENTS

| | | |
|---|---|---|
| 171,041 | Great Britain | Nov. 10, 1921 |
| 675,994 | France | Feb. 17, 1930 |